United States Patent [19]
Sato

[11] Patent Number: 5,738,884
[45] Date of Patent: Apr. 14, 1998

[54] MULTI-STAGE VACUUM KNEADING-EXTRUDER APPARATUS

[75] Inventor: Takuya Sato, Suita, Japan

[73] Assignee: Sato Iron Works Co., Ltd., Osaka, Japan

[21] Appl. No.: 706,903

[22] Filed: Sep. 3, 1996

Related U.S. Application Data

[63] Continuation of Ser. No. 335,649, Nov. 8, 1994, abandoned.

[30] Foreign Application Priority Data

Oct. 4, 1994 [JP] Japan .................................. 6-239935

[51] Int. Cl.$^6$ .................................................. B29C 47/38
[52] U.S. Cl. .......................... 425/197; 425/199; 425/203; 425/205; 425/208; 425/209; 425/297; 425/147; 366/82
[58] Field of Search ............................ 425/147–148, 425/197–199, 203, 205, 208–209, 297, 204, 382.3; 366/75–76, 87–89, 82

[56] References Cited

U.S. PATENT DOCUMENTS

| | | | |
|---|---|---|---|
| 2,640,033 | 5/1953 | Marshall | 252/367 |
| 4,077,754 | 3/1978 | Borcher et al. | 425/205 |
| 4,090,829 | 5/1978 | Fischer et al. | 425/205 |
| 4,378,897 | 4/1983 | Kattelmann | 222/56 |
| 4,849,113 | 7/1989 | Hills | 425/199 |
| 4,881,670 | 11/1989 | Yamaoka et al. | 222/590 |
| 4,913,320 | 4/1990 | Stazhevsky et al. | 222/168 |
| 4,983,114 | 1/1991 | Hauck | 425/203 |
| 5,055,027 | 10/1991 | Sato | 425/199 |
| 5,366,365 | 11/1994 | Sullivan et al. | 425/147 |

FOREIGN PATENT DOCUMENTS 5104609  4/1993  Japan.

*Primary Examiner*—Hien Tran
*Attorney, Agent, or Firm*—Felfe & Lynch

[57] ABSTRACT

A multi-stage vacuum kneading-extruder includes a degassing chamber for storing material to be processed and reducing pressure of space for storing the material, a kneading-conveyer device for kneading while conveying the material sent from the degassing chamber, and an extruding mechanism for extruding the kneaded material, at a conveyer terminal end of the kneading-conveyer device, into a predetermined shape. The kneading-conveyer includes a pair of conveyer screws disposed one after another in a conveying direction of the material and a grinding-kneading mechanism interposed between the front and rear screws. The grinding-kneading mechanism includes a plurality of unit kneading mechanisms disposed in opposition to each other relative to the material conveying direction. Each of the unit kneading mechanisms includes an un-rotatable stationary disc, a rotary disc rotatable relative to the stationary disc and a stationary filter interposed between the stationary and rotary discs.

13 Claims, 6 Drawing Sheets

MULTI-STAGE VACUUM KNEADING-EXTRUDER APPARATUS

This application is a continuation of U.S. application Ser. No. 08/335,649 filed Nov. 8, 1994, now abandoned.

BACKGROUND OF THE INVENTION

1. Field of the Invention

The present invention relates generally to a multi-stage vacuum kneading-extruder apparatus, and more particularly to improvement of a multi-stage vacuum kneading-extruder apparatus for kneading and mixing chemical material such as soap chips as raw material of soap and a variety of oil and fats, degassing the material by reduced pressure and then extruding the resultant material into a predetermined shape.

2. Description of the Related Art

A vacuum kneading-extruder apparatus of the above-noted type is known from the Japanese published patent gazette Hei. 4-22613, for instance. This apparatus includes a kneading-conveyer device consisting essentially of a pair of a conveyer screw and a grinding-kneading mechanism disposed one after another along a conveying direction.

By constructing the kneading-conveyer device from the combination of the pair of the conveyer screw and the grinding-kneading mechanism, the apparatus may achieve kneading performance superior to that provided by such kneading operation effected merely by simple mixing or extruding through a constricted passage.

However, a kneading operation with greater refinement may be needed depending on a particular type of material to be processed.

Specifically, in case soap chips are to be processed, the soap chips tend to retain fine and hard particles, commonly referred to as hard specks. Then, if a large number of hard specks remain in the finished product, the retained specks will result in deterioration of the quality of the product by giving coarse touch to the user. In order to reliably avoid retention of kneading-retardant material such as the hard specks, it is conceivable to minimize the cross section of the filter passage opening of the grinding-kneading mechanism. This, however, results in significant increase of the passage resistance experienced by the material to be passed through this grinding-kneading mechanism, so that the drive load increases correspondingly. Moreover, the heat generated by the increased resistance may adversely change the properties of the material. Therefore, such arrangement is not desirable in practice.

In order to provide a kneading operation with greater refinement, as shown in FIG. 7, the prior art teaches a multi-stage construction in which plural pairs of the conveyer screws 01 and the grinding-kneading mechanisms 02 are disposed one pair after another along the material conveying direction.

While the prior art apparatus is advantageous indeed for being capable of achieving a mixing-kneading operation with greater refinement, the construction of the mixing-kneading apparatus requires the plural stages of the conveyer screws and the grinding-kneading mechanisms. For this reason, the entire apparatus has a significant length.

Furthermore, in the case of the kneading-conveying apparatus consisting of the pairs of conveyer screws and the grinding-kneading mechanisms, all of the conveyer screws and the grinding-kneading mechanisms provided in a plurality of stages need to be disassembled and dismounted in an individual manner in order to allow replacement of the filters, cleaning operation for changing the color of soap or other maintenance operations. As a result, the maintenance operations of the apparatus are very troublesome.

A primary object of the present invention is to an improved apparatus which is compact yet capable of providing mixing and kneading operation in a sufficient manner and which also allows easier maintenance operations.

SUMMARY OF THE INVENTION

For accomplishing the above-noted object, a multi-stage vacuum kneading-extruder apparatus comprises:

a degassing chamber for storing material to be processed and reducing pressure in the material;

a kneading-conveyer device for kneading while conveying the material sent from the degassing chamber;

an extruding mechanism for extruding the kneaded material, at a conveyer terminal end of the kneading-conveyer device, into a predetermined shape.

The kneading-conveyer includes a pair of conveyer screws disposed one after another in a conveying direction of the material, and a grinding-kneading mechanism interposed between the front and rear screws.

The grinding-kneading mechanism includes a plurality of unit kneading mechanisms disposed in opposition to each other relative to the material conveying direction, each of the unit kneading mechanisms including an un-rotatable stationary disc, a rotary disc rotatable relative to the stationary disc and an un-rotatable stationary filter interposed between the stationary and rotary discs.

According to the above construction, for a mixing-kneading operation in more than two stages under vacuum, in spite of the increased number of kneading process stages, the apparatus may employ only one pair of conveyer screws disposed one after another where the grinding-kneading mechanisms are provided.

Therefore, when a kneading operation to such a degree substantially equal to that provided by the convention, in comparison with the construction including the multiple stages of plural pairs of conveyer screws and the grinding-kneading mechanisms along the material conveying direction, the entire apparatus construction of the present invention is much simpler and more compact.

In addition, due to the reduced number of conveyer screws, fewer portions of the apparatus need to be disassembled and detached for apparatus detachment or disassembly, so that the maintenance operations also become less troublesome.

According to one aspect of the present invention, the multi-stage vacuum kneading-extruder apparatus further comprises a feeding conveyer screw for feeding the material to the degassing chamber, the grinding-kneading mechanism being disposed at a downstream terminal end of the feeding conveyer screw.

According to this construction, by using the grinding-kneading mechanism including a plurality of unit kneading mechanisms, the entire kneading conveyer apparatus may be compact in spite of its plurality of kneading stages. For this reason, this grinding-kneading mechanism including the plural unit kneading mechanisms may be disposed in a compact manner within a kneading-conveying stage rather limited in space from a continuous measuring unit to the degassing chamber.

As a result, in the case of a vacuum extruder apparatus in which plural units of kneading-conveyer devices are provided in the material feeding passage to the degassing chamber, the kneading operation is effected also in this feeding passage extending to the degassing chamber, thereby to achieve further improvement of kneading refinement of the entire apparatus while avoiding local concentration of the drive load of the apparatus. That is to say, in comparison with the arrangement where the grinding-kneading mechanism is provided only in the kneading-conveyer apparatus disposed on the downstream side of the degassing chamber, the above construction reduces the number of kneading stages on the downstream side of the degassing chamber while providing a kneading refinement of substantially same degree. Therefore, it becomes possible to avoid increase of the drive load and of temperature of the material associated with increase of the conveying load, on the downstream side of the degassing chamber. As a result, this construction achieves the advantage of allowing a kneading operation of even greater refinement while avoiding such inconvenience as the adverse quality change of the material being processed.

According to a still further aspect of the present invention, in the unit kneading mechanism of the grinding-kneading mechanism, the rotary disc is disposed on an upstream side relative to the conveying direction of the material and the stationary disc is disposed on a downstream side the rotary disc is operatively connected with the upstream conveyer screw via attaching means insertable and withdrawable from the downstream side and a spacer interposed between the rotary disc and a further rotary disc. Each stationary disc has an outer end thereof fixed to a kneading casing accommodating each unit kneading mechanism, the stationary disc disposed on the upstream side relative to the rearmost rotary disc having an inner end thereof supported to a bearing member disposed outside the spacer and mounted on a screw shaft.

This construction has the advantage of simplifying the transmission arrangement to each rotary disc and the further advantage of facilitating maintenance that all of the rotary discs may be readily mounted or dismounted simply by inserting or withdrawing the attaching means from the downstream side relative to the conveying direction when the downstream conveyer screw is detached.

Moreover, since the inner end of the stationary disc is supported by the bearing member disposed outside the spacer fitted on the screw shaft, the stationary disc interposed between two rotary discs may be provided with sufficient attachment strength by being supported from the inside and the outside. Further, the stationary discs are provided at a plurality of locations along the axis of the screw shaft, so that the screw shaft may be supported with sufficient strength by being supported by the bearing members which are dispersed over an extended length.

Consequently, the transmission structure to each rotary disc may be simple and sturdy. Further, the maintenance advantage is that all of the rotary discs may be readily mounted or dismounted simply by inserting or withdrawing the attaching means from the downstream side relative to the conveying direction when the downstream conveyer screw is detached.

According to a still further aspect of the present invention, the downstream conveyer screw has a pitch greater than the upstream conveyer screw.

With this arrangement, since the downstream conveyer screw has a spiral pitch which is greater than the spiral pitch of the upstream conveyer screw, the passage of the material through the intermediate grinding-kneading mechanism may be facilitated through cooperative effect between a pushing-in function of the upstream conveyer screw and a pulling-out function of the downstream conveyer screw.

As a result, this construction further facilitates the kneading operation of the material being processed.

Further and other objects, features and effects of the invention will become more apparent from the following more detailed description of the embodiments of the invention with reference to the accompanying drawings.

DESCRIPTION OF THE PREFERRED EMBODIMENTS

Figure 1:
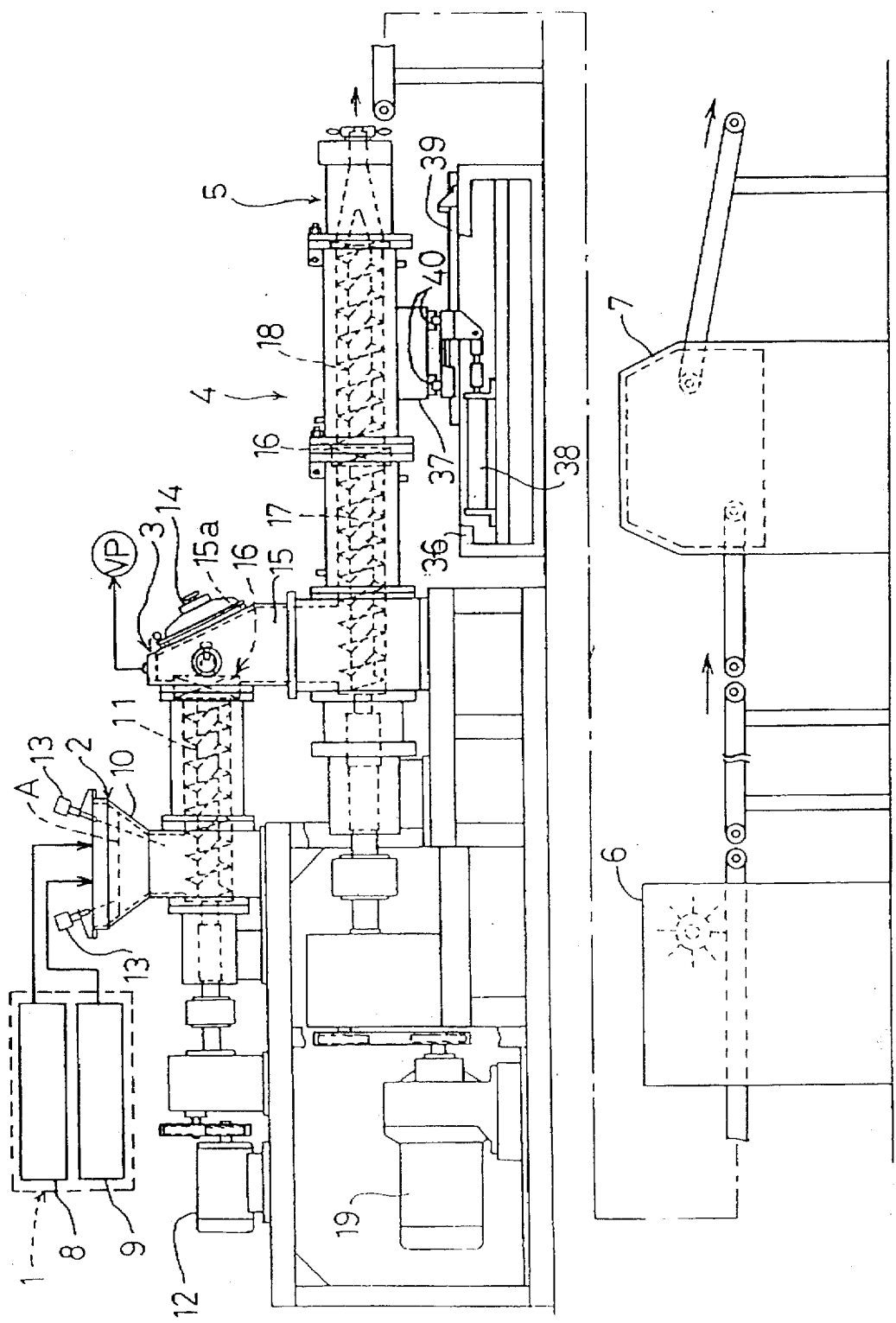
FIG. 1 is a side view showing an entire multi-stage vacuum kneading-extruder apparatus.

Preferred embodiments of a multi-stage vacuum kneading-extruder apparatus relating to the present invention will be described in details with reference to the accompanying drawings.

As shown in FIGS. 1 through 5, a multi-stage vacuum kneading-extruder apparatus according to the present invention includes a measuring unit 1 for individually and continuously measuring amounts of a plurality of kinds of material to be processed, a receiver container 2 for receiving the material A from the measuring unit 1, a degassing chamber 3 for degassing the material A, a kneading-conveyer device 4 for conveying the material A and an extruder mechanism 5 for extruding the material A into a shape. Further, at the last processing end of this multi-stage vacuum kneading-extruder apparatus, as an after-processing device for the extruded article, there are provided, in series, an automatic cutting device 6 and an automatic stamping device 7.

The measuring device 1 includes a first measuring unit 8 for measuring and feeding raw material and a second measuring unit 9 for measuring and feeding fragrance, pigment or the like; and these units 8, 9 are disposed on the upstream side, relative to a conveying direction of the material A, of the receiver container 2 into which the material A is charged.

The receiver container 2 includes a receiving hopper 10 providing a mixing region for stirring and mixing the material A. Forwardly and rearwardly through a bottom portion of this hopper 10, there is extended a horizontally oriented conveyer screw 11, so that the charged material A may be stirred and mixed and then forcibly fed through a feed opening formed at the bottom portion of the hopper.

The conveyer screw 11 receives drive input from a drive motor 12 from an upstream end of the screw relative to the conveying direction of the material A. Adjacent the other end of the screw 11, there is provided a grinding-kneading mechanism 16 which is similar to a further grinding-kneading mechanism 16 of the kneading-conveyer device 4 to be detailed later. In operation, with the forcible feeding action of the conveyer screw 11, the material A is fed to the downstream side to pass through the grind-kneading mechanism 16.

Incidentally, a feeding amount of the material A by the receiver container 2 and a feeding amount of the material A by the measuring unit 1 are set to substantially equal each other so that a predetermined amount of material A may be constantly present inside the receiver hopper 10. More particularly, within the receiver hopper 10, there are provided a pair of level sensors 13 for detecting an upper limit level and a lower limit level of the material A, so that an un-illustrated control device controls the amount fed by the measuring unit 1 so that the upper level of the material A is between the upper and lower limit levels.

The degassing chamber 3 includes a vacuum chamber 15 for reducing the pressure of the mixed material A on its way to the kneading-conveyer device 4 thus establishing a degassing area for reducing the air content of the material A. The vacuum chamber 15 is communicated with a vacuum pump VP and also its passage extending from the receiver hopper 10 to the exit opening of the conveyer screw 11 is blocked by the presence of the material A being processed. Hence, the inside of this vacuum chamber 15 may be utilized as a pressure-reducing space. And, by maintaining this space under a pressure-reduced state, the material A may be degassed.

The vacuum chamber 15 includes an opening 15a located on an extension from the screw shaft and a lid 14 operable to open and close the opening 15a. Then, by opening this lid 14, maintenance operations may be readily effected through the opening 15a for detaching the screw shaft of the screw 11 or detaching the grinding-kneading mechanism 16 disposed at the terminal end of the shaft.

As shown in FIGS. 1 through 4, the kneading-conveyer device 4 includes a pairs of screws consisting of a first conveyer screw 17 disposed on an upstream side of the transport direction and of a second conveyer screw 18 disposed on the downstream side and the grinding-kneading mechanism 16 disposed between the two conveyer screws 17, 18. As the kneading-conveyer device 4 is communicated with the vacuum chamber 15 disposed immediately below the degassing chamber 3, the inside of this kneading-conveyer device 4 too is maintained under the pressure-reduced state by the function of the vacuum pump. Accordingly, the material A transported by the two conveyer screws 17,18 is transported and kneaded under this pressure-reduced condition. The first conveyer screw 17 and the second conveyer screw 18 respectively include conveyer screw shafts 17A, 18A and cylinders 17B, 18B accommodating the conveyer screw shafts 17A, 18A. And, the grinding-kneading mechanism 16 is provided between the upstream first screw shaft 17A and the downstream second screw shaft 18A and between the cylinders 17B, 18B accommodating these screw shafts 17A, 18A.

As to these conveyer screws 17, 18, the downstream screw shaft 18A has a spiral pitch slightly greater than that of the upstream screw shaft 17A. And, these screw shafts are rotatably driven approximately at 5–30 rpm by an electric motor 19 through an appropriate reduction mechanism.

Figure 4:
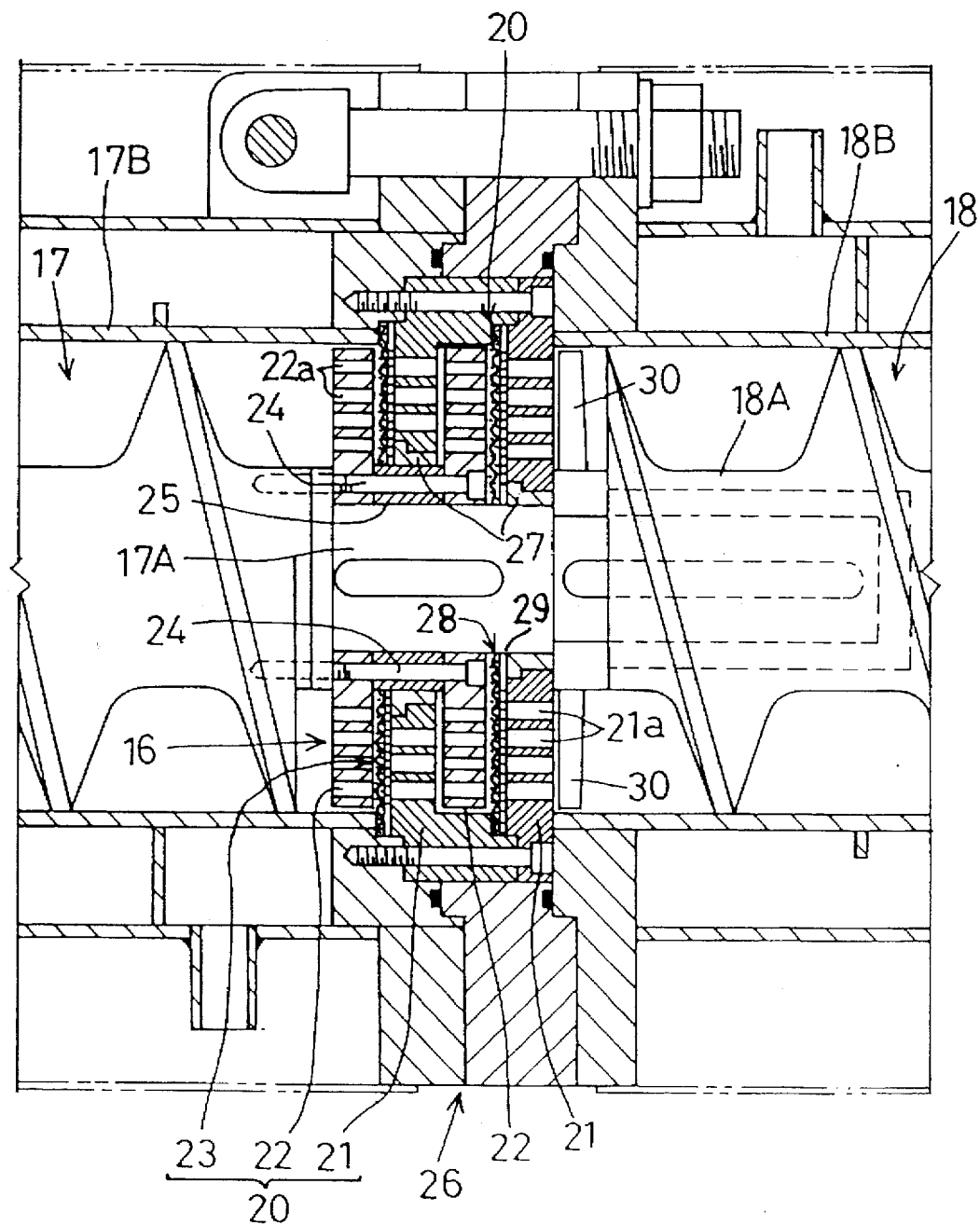
FIG. 4 is an enlarged section view showing a portion of a kneading-conveyer device.

Referring now to FIG. 4, the grinding-kneading mechanism 16 includes a plurality of unit kneading mechanisms 20 disposed in opposition to each other relative to the conveying direction of the material A, with each unit kneading mechanism 20 including stationary discs 21 unrotatably fixed to the cylinders 17B, 18B which together constitute an outer casing for the kneading-conveyer device 4. Rotary discs 22 are fixed to screw shaft 17a and rotatable relative to the stationary discs 21 and stationary filters 23 (to be described later) interposed between the stationary discs 21 and the rotary discs 22 and fixed together with the stationary discs 21.

As the material A is forced through between the stationary disc 21 and the rotary disc 22 rotatable relative thereto, the material A may be kneaded by being subjected to a strong kneading effect.

Figure 5:
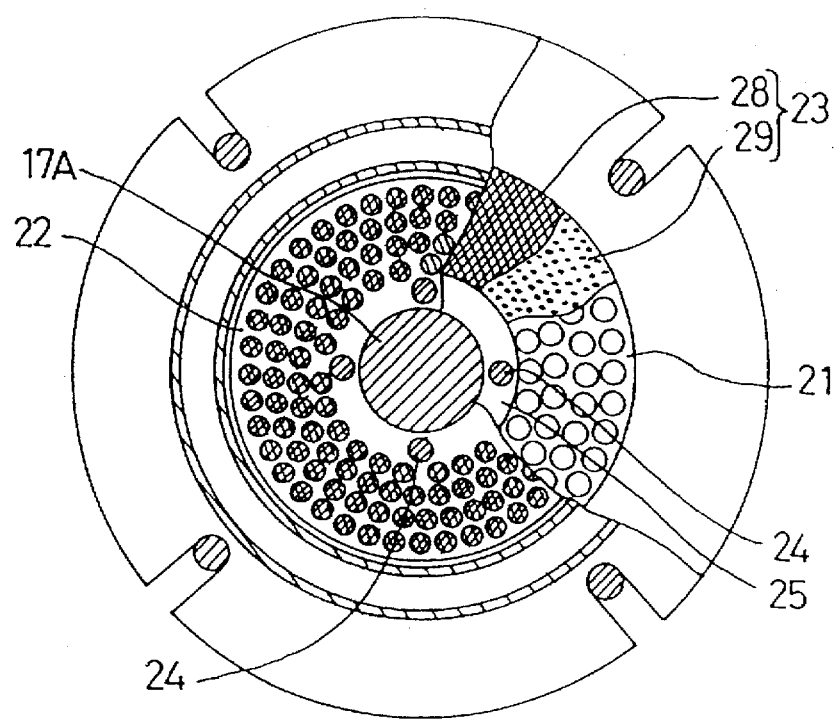
FIG. 5 is a partial section view of a grinding-kneading mechanism.

Referring also to FIG. 5 the rotary disc 22 and the stationary disc 21 respectively include through holes 22a, 21a, both having an opening area ratio of approximately 50%, for the passage of the material A therethrough. Then, the material A which was previously present within the first conveyer screw 17 obtains a velocity when passing through the through holes 22a, 21a, which velocity is about twice as high as the velocity of the material being pressed inside the first conveyer screw 17. Then, as the material A receives the pushing-in pressure and is sharply accelerated, the material may be kneaded through its own plastic deformation.

When the material A imparted with the rotary action of the rotary disc 22 is forced into the through hole 21a of the stationary disc 21, the material is subjected to a grinding-kneading effect associated with the severing effect between the two discs 21, 22. Further, between these discs 21, 22, there is interposed the stationary filter 23 providing a passage opening having a sufficiently smaller opening diameter than the through holes 21a, 22a of the discs, so that the material A in the middle of the grinding-kneading process may be kneaded even more finely. Thus, with the combination of these various kinds of kneading effects, a very fine kneading operation may be effected.

The first screw shaft 17A and the second screw shaft 18A are keyed to each other so as to rotate together. Further, the first screw shaft 17A and the upstream rotary disc 22 too are keyed to each other.

The downstream rotary disc 22 is operatively connected to the first screw shaft 17A by means of a plurality of attaching bolts 24 as an example of attaching means. In this, between the two rotary discs 22, a spacer 25 having through holes for allowing insertion of the attaching bolts 24 is mounted on the screw shaft 17A. That is, the first screw shaft 17A, the two rotary discs 22 and the spacer 25 are fixed to one another to be rotatable in unison.

The stationary disc 21 is fixed to a kneading casing 26 of the grinding-kneading mechanism 16 constituting the connection between the first cylinder 17B accommodating the first screw shaft 17A and the second cylinder 18B accommodating the second screw shaft 18A.

This stationary disc 21 rotatably supports the first screw shaft 17A via a resin bearing member 27 outwardly fitted on the spacer.

Each filter 23 comprises a combination of a disc mesh 28 needed for filtering the raw material and a punching plate 29 having a number of holes smaller that, the through holes 21a, 22a of the discs 21, 22. As shown in FIG. 4, each filter 23 is fixedly bound to a stationary disc 21 and the kneading casing 26. In operation, the punching plate 29 functions to add to the strength of the disc mesh 28 when the disc mesh 28 is disposed on the upstream side. The filter 23 also constitutes filter means for the material A together with the disc mesh 28.

In this filter 23, the disc mesh 28 is disposed more upstream in the conveying direction of the material A than the punching plate 29 and forwardly of the stationary disc 21 and has a clearance of approximately 0.5–3 mm from the upstream rotary disc 22. The disc mesh 28 is formed of a metal material (e.g. stainless steel: SUS 304 of JIS), and this mesh if formed of such material rated between #20 and #50, will be suitable for kneading soap material. Further, the punching plate 29 too is formed of a similar metal material (e.g. stainless steel: SUS 304 of JIS) and has a thickness ranging approximately between 0.8 and 2.0 mm, a hole diameter ranging approximately between 0.5 and 2 mm and an opening ratio ranging approximately 25 and 50%. And, each punching plate 29 and the disc mesh 28 are integrally joined together, through peripheries thereof, by such appropriate joint means as soldering.

The above-specified settings of the plate thickness, hole diameter, opening ratio and the clearance relative to the rotary disc 22 are so determined, because these have proven suitable for obtaining soap having an appropriate ratio between ω type crystals and β type crystals if raw material for soap is used as the material A to be processed. In other words, if the hole diameter, opening ratio and the clearance of the mesh are set with significant deviation from the above-specified ranges, there is the possibility of insufficient kneading of the material A which results in an insufficient ratio of the β type crystals present therein or excessive kneading of the same which results in insufficient ratio of the ω type crystals present therein. Concerning the quality of the soap, a soap containing a large amount of ω type crystals has high resistance against dissolving. Conversely, a soap containing a large amount of β type crystals has good bubbling property. Therefore, the various setting values may be determined within the above-specified ranges, depending on which crystal ratio is considered more important. Preferably, a plurality of kinds of filters 23 for providing a variety of set values may be prepared, so that these filters may be selectively employed according to the desired ratio between these types of crystals.

Incidentally, a reference numeral 30 in FIG. 4 denotes a cutter blade operatively fixed to the first screw shaft 17A. And, this cutter blade is so disposed as to face the downstream face of the last stationary disc 21.

Figure 3:
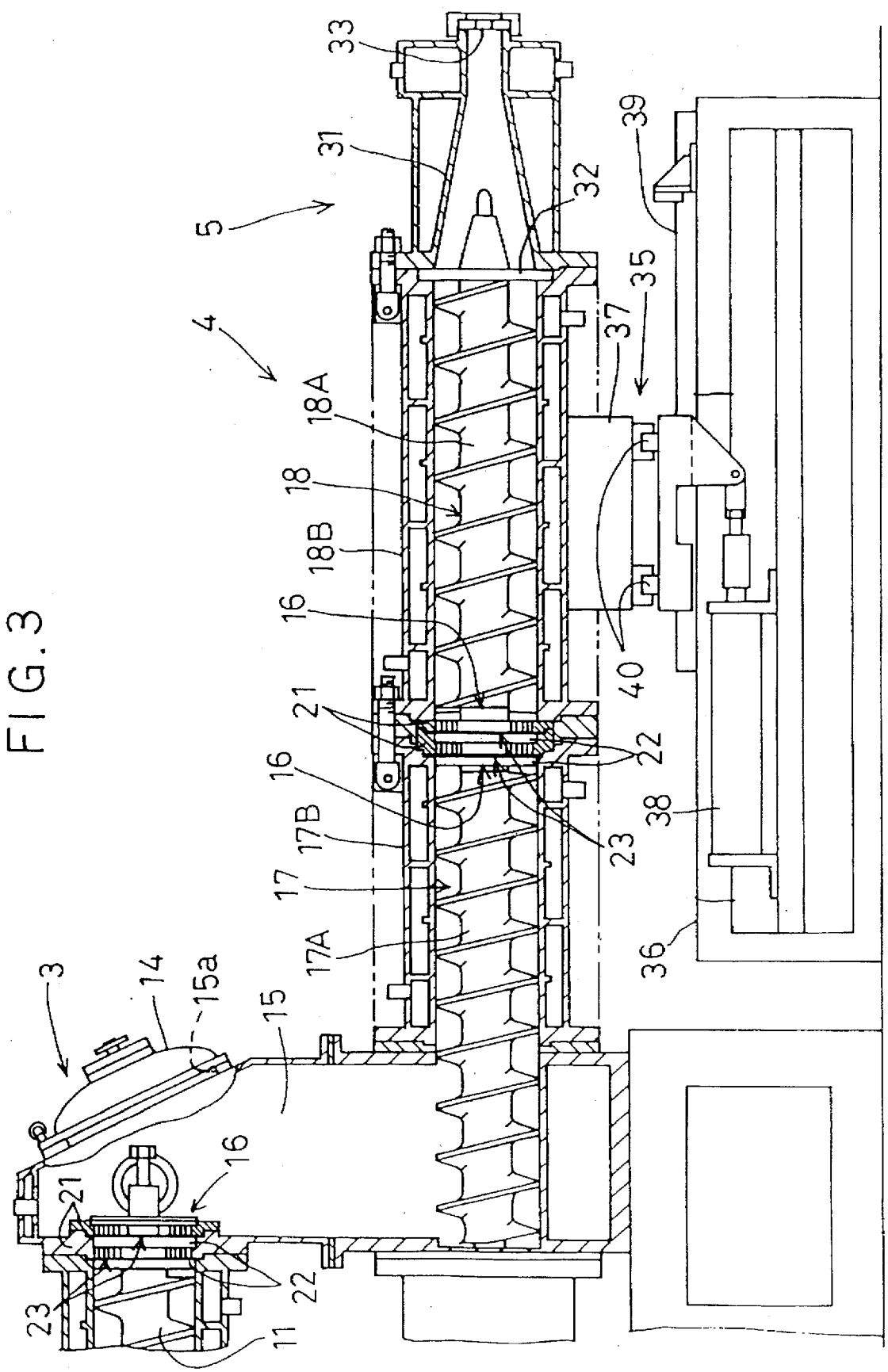
FIG. 3 is a section elevation view showing a portion of the multi-stage vacuum kneading-extruder apparatus.

The extruding mechanism 5, as shown in FIG. 3, includes a constricted cylinder 31 pivotably connected to the terminal end of the second cylinder 18B so as to be pivotable about a vertical axis to be opened or closed, a rectifier plate 32 having a number of small holes and disposed forwardly of the constricted cylinder 31 and a molding die 33 disposed rearwardly of the constricted cylinder 31.

Figure 2:
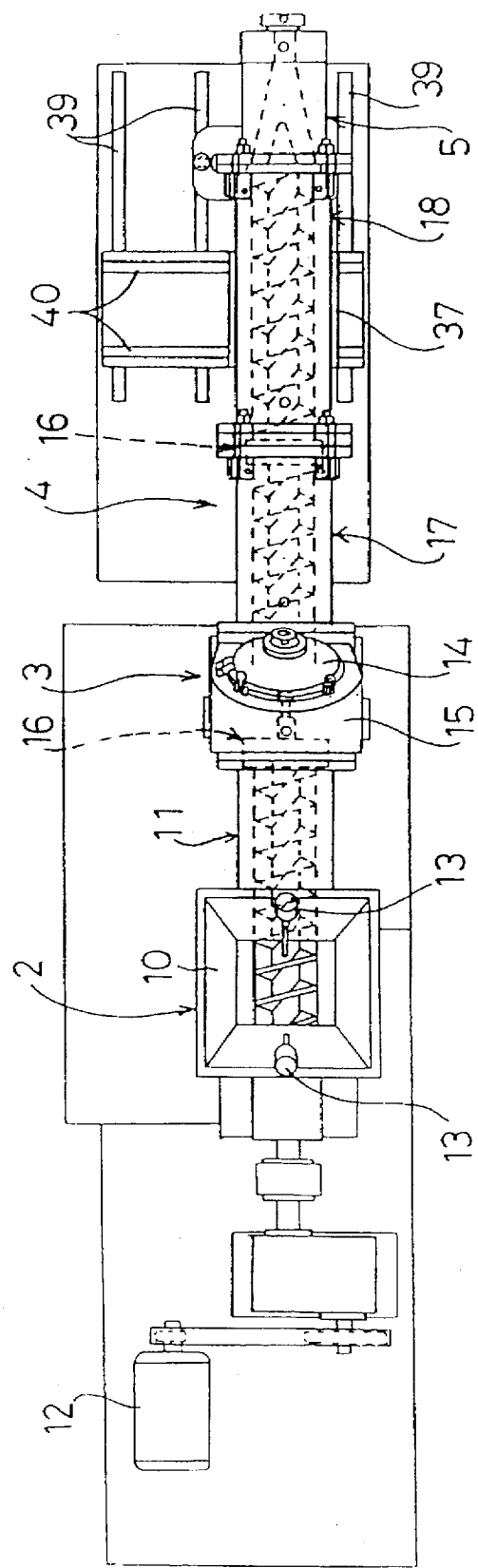
FIG. 2 is a plan view showing the entire multi-stage vacuum kneading-extruder apparatus.

Under the kneading-conveyer device 4, as shown in FIGS. 1 through 3, there is provided a transporting device 35 operable to support the second conveyer screw 18 to change its forward/rear and right/left orientation, when this downstream second conveyer screw 18 is dismounted.

The transporting device 35 includes a stationary table 36, and a movable table 37 movable relative to the stationary table 36 along the length of the second conveyer screw 18, an air-actuated type expansion and contraction cylinder 38 acting as drive means for moving the movable table 37 along the length of the conveyer screw, a first guide rail 39 disposed on the stationary table 36 for guiding the movable table 37 along the length of the second conveyer screw 18, and a second guide rail 40 for guiding the movable table 37 in a direction normal to the first guide rail 39. Incidentally, with this transporting device 35, for moving the second conveyer screw 18 on the movable table 37 in a direction normal to the above-mentioned direction, the screw is caused to move on the transversely oriented second guide rail 40 by manually pushing the screw sideways.

Referring to FIG. 1, the automatic cutting device 6 includes a known cutter device disposed on the downstream side of the multi-stage vacuum kneading-extruder apparatus relative to the conveying direction of the material A and so designed as to cut the bar-shaped material A extruded from the molding die 33 into dices of a predetermined size.

The automatic stamping device 7 is comprised of a known stamping device disposed on the downstream side of the automatic cutting device 6 and operable to stamp a predetermined mark, a product name or the like on the material A fed thereto.

The material A to be processed includes e.g. soap chips, a variety of oil and fats, and these materials are generically referred to herein as the material A.

A method of the present invention comprises: a measuring step for measuring a plurality of kinds of raw material in an individual and continuous manner and charging the material into the degassing chamber 3; a mixing-degassing step for reducing pressure of space in which the material is present thereby degassing the material; a grinding-kneading step for kneading and conveying the material under the pressure-reduced condition by plural stages of grinding-kneading mechanisms; and an extruding step for extruding the kneaded material into a predetermined shape.

These steps and further steps subsequent thereto are effected in the following order of (1) to (6) in the manners to be described next.

(1) measuring step

On the upstream side in the conveying direction of the material A relative to the receiver container 2 into which the material A is charged, the first measuring unit 8 for measuring and feeding the base materials and the second measuring unit 9 for measuring the fragrance, pigment or the like are provided. So that, by these measuring units 8, 9, predetermined amounts of the base materials and the fragrance or the like are continuously measured and fed into the receiver container 2.

(2) mixing-degassing step

The material A charged into the receiver container 2 is first stirred and mixed by the conveyer screw 11 provided at the bottom of the receiver container 2 and acting also as a stirring means and then is fed into the kneading-conveyer device 4 extending continuously from the lower end of the degassing chamber 3. In this, the vacuum chamber 15 formed downwardly of the first grinding-kneading mechanism 16 disposed downstream of the conveyer screw 11 is connected with a flow passage communicated with the vacuum pump, so that this vacuum chamber 15 functions as a pressure-reducing space. That is, inside this pressure-reducing space, the air content present inside the material A is eliminated due to the reduced pressure, thereby to effect a degassing operation.

(3) grinding-kneading step

The kneading-conveyer device 4 is connected and communicated with the lower part of the vacuum chamber 15 of the degassing chamber 3. So that, by the function of the vacuum pump, the insides of the cylinders 17B, 18B of this kneading-conveyer device 4 too are maintained under the pressure-reduced state. Thus, the material A being conveyed by the conveyer screw 18, is conveyed and subjected to the grinding-kneading effect under the pressure-reduced state.

(4) extruding step

At the terminal end of the conveying passage of the conveyer screw 18, the extruding die 33 is fixed to the conveyer cylinder 17. Then, by the extruding effect of the conveyer screw 18, the material is extruded into a bar shape.

(5) dicing step

The bar-shaped material A extruded from the extruding die 33 is diced into a predetermined size by means of the cutting device 6 disposed downstream of the vacuum kneading-extruder apparatus.

(6) stamping step

Each billet of the material A is stamped with a predetermined mark such as a product name.

Next, some other embodiments of the invention will be described.

(1) In the foregoing embodiment, the degassing chamber 3 and the receiver container 2 are provided separately. Instead, the mixing area and the degassing area may be provided by a single integral tank.

(2) In the foregoing embodiment, the grinding-kneading mechanism 16 includes two unit kneading mechanisms 20. Instead, three or more of unit kneading mechanisms 20 may be provided.

Figure 6:
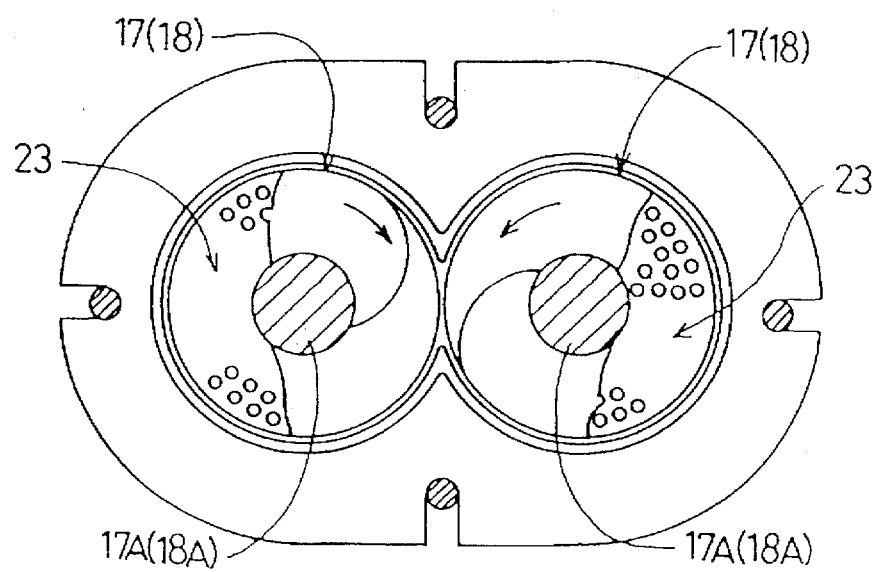
FIG. 6 is a view showing a portion of a multi-stage vacuum kneading-extruder apparatus according to a further embodiment of the invention.
Figure 7:
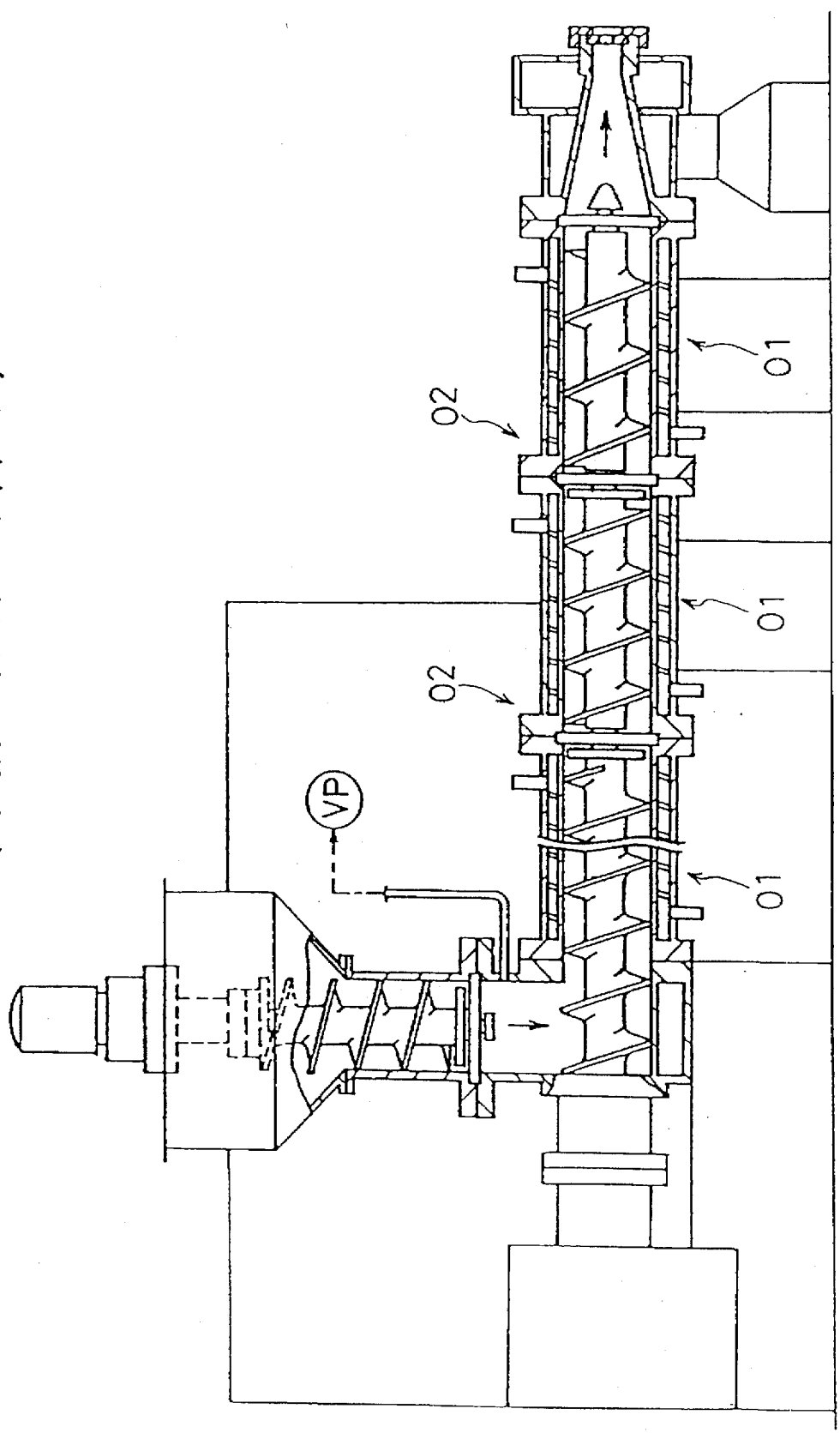
FIG. 7 is a view showing a conventional multi-stage vacuum kneading-extruder apparatus.

(3) As shown in FIG. 6, the kneading-conveyer device 4 may be a twin-screw type construction which includes a plurality of conveyer screws disposed side by side, so that the material A fed from the degassing chamber 3 may be processed in a parallel manner through more than two passages. In this case, the filter 23 too may be of a twin-screw type in which a plurality of the single screw type shown in FIG. 5 for processing the material A through the single passage will be provided, with the filters being partially connected to each other through peripheries thereof.

The application of the multi-stage vacuum kneading-extruder relating to the present invention is not limited to the purpose of kneading of soap material, but the apparatus may be employed for a variety of applications such as oil fats, food products, medicines or the like.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A multi-stage vacuum kneading-extruder apparatus comprising:

a receiver container for receiving material, said receiver container including level sensor means for detecting an upper limit level and a lower limit level of the material in said container;

a feed conveyor screw for conveying material from the receiver container;

a degassing chamber for storing material conveyed by the conveyor screw and degassing the stored material;

a kneading-conveyor device for kneading while conveying the material from the degassing chamber;

an extruding mechanism for extruding the kneaded material, at a conveyor terminal end of the kneading-conveyor device, into a predetermined shape;

wherein, said kneading-conveyor device includes, a pair of upstream and downstream conveyor screws disposed one after another in a conveying direction of the material, a grinding-kneading mechanism interposed between said upstream and downstream screws, said grinding-kneading mechanism comprising a plurality of unit kneading mechanisms disposed in opposition to each other relative to the material conveying direction, each of said unit kneading mechanisms including an un-rotable stationary disc, and a rotary disc rotatable relative to said stationary disc and a stationary filter interposed between said stationary and rotary discs, wherein all of said plurality of rotary discs being fixed to a single one of said conveyor screws by common attaching means in such a way that said plurality of rotary discs can be fixed to or removed from said single one of said conveyor screws.

2. A multi-stage vacuum kneading-extruder apparatus as claimed in claim 1, wherein in each said unit kneading mechanism of the grinding-kneading mechanism, said rotary disc is disposed on an upstream side relative to the conveying direction of the material and said stationary disc is disposed on a downstream side relative to the same, all of said rotary discs being operatively connected with said downstream conveyor screw via the common attaching means insertable and withdrawable from the downstream side and a spacer interposed between one rotary disc and the rotary disc of another said unit kneading mechanism, each said stationary disc having an outer end thereof fixed to a kneading casing accommodating each said unit kneading mechanism, said stationary disc disposed on the upstream side relative to the rearmost rotary disc supporting a bearing member disposed concentrically about said spacer.

3. A multi-stage vacuum kneading-extruder apparatus as claimed in claim 1, wherein said downstream conveyor screw has a pitch greater than said upstream conveyor screw.

4. A multi-stage vacuum kneading-extruder apparatus as claimed in claim 3, further comprising:

an automatic cutting device and an automatic stamping device provided downstream of said extruding mechanism.

5. A multi-stage vacuum kneading-extruder apparatus as claimed in claim 1, wherein said conveyor screws are driven to rotate at 5 to 30 rpm.

6. A multi-stage vacuum kneading-extruder apparatus as claimed in claim 1, wherein said stationary and rotary discs respectively define through holes for the material having an opening ratio of 50%.

7. A multi-stage vacuum kneading-extruder apparatus as claimed in claim 6, wherein said filter includes a disc mesh for filtering the material and a punching plate having a number of holes smaller than said through holes of the stationary and rotary discs.

8. A multi-stage vacuum kneading-extruder apparatus as claimed in claim 7, wherein in each unit kneading mechanism, said rotary disc is disposed upstream of said disc mesh and said disc mesh is disposed upstream of said punching plate and a clearance of 0.5–3 mm is provided between said upstream rotary disc and said disc mesh.

9. A multi-stage vacuum kneading-extruder apparatus as claimed in claim 8, wherein said punching plate has a thickness ranging between 0.8 and 2.0 mm, a hole diameter ranging between 0.5 and 2.0 mm and an opening ratio ranging 25 and 50%.

10. A multi-stage vacuum kneading-extruder apparatus as claimed in claim 1, wherein said kneading-conveyor device comprises a plurality of said conveyor screw pairs disposed side by side, so that the material fed from said degassing chamber is processed in a parallel manner through more than two passages.

11. Apparatus as in claim 1 further comprising at least one of said unit kneading mechanisms disposed between said feed conveyor screw and said degassing chamber.

12. A multi-stage vacuum kneading extruder apparatus comprising a degassing chamber for storing material and reducing pressure in said material;

a first conveyor screw disposed downstream of said degassing chamber in a conveying direction;

a plurality of unit kneading mechanisms disposed downstream of said first conveyor screw, each said kneading mechanism comprising a stationary disc, and a rotatable disc, and stationary filter means disposed between said stationary disc and said rotary disc wherein all of said plurality of rotatable discs being fixed to said first conveyor screw by common attaching means in such a way that said plurality of rotatable discs can be fixed to or removed from said one of said conveyor screws;

a second conveyor screw disposed downstream of said plurality of unit kneading mechanisms; and an extruding mechanism disposed downstream of said second conveyor screw for extruding the material.

13. Apparatus as in claim 12 wherein the rotatable disc of each unit kneading mechanism is located upstream from the stationary disc of said each unit kneading mechanism, all of said rotatable discs being fixed relative to said first conveyor screw and rotatable therewith.

\* \* \* \* \*